Figure 1:
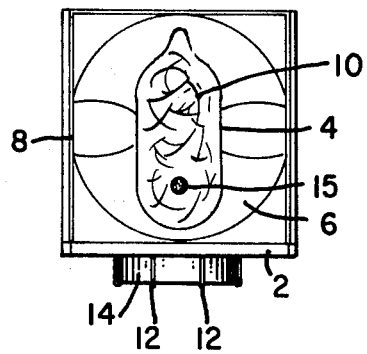

United States Patent                                                                                      [11] 3,609,331

| [72] | Inventors | William C. Fink<br>Williamsport;<br>John W. Shaffer, Montoursville, both of Pa. |
|---|---|---|
| [21] | Appl. No. | 740,242 |
| [22] | Filed | June 26, 1968 |
| [45] | Patented | Sept. 28, 1971 |
| [73] | Assignee | Sylvania Electric Products Inc. |

[54] PHOTOFLASH LAMP
6 Claims, 2 Drawing Figs.

| [52] | U.S. Cl. | 240/1.3, 431/93 |
|---|---|---|
| [51] | Int. Cl. | G03b 15/02 |
| [50] | Field of Search | 431/93–95; 240/1.3 |

[56]             References Cited
UNITED STATES PATENTS

| 1,666,339 | 4/1928 | Miller | 337/265 |
|---|---|---|---|
| 3,315,070 | 4/1967 | Pfefferle | 431/93 X |
| 2,198,162 | 4/1940 | Greenwald | 73/356 |

FOREIGN PATENTS

| 255,897 | 7/1967 | Austria | 431/93 |

*Primary Examiner*—Samuel S. Matthews
*Assistant Examiner*—Fred L. Braun
*Attorneys*—Norman J. O'Malley and Joseph C. Ryan ABSTRACT: A flashcube in which readily visible indicators are provided for identifying a flashed lamp. The indicator material is responsive to the heat generated by the flashlamp to thereby be deposited on the window of the flashcube and define a noticeable colored area thereon.

PATENTED SEP28 1971  3,609,331

INVENTORS
JOHN W. SHAFFER
WILLIAM C. FINK
BY Joseph C. Ryan
ATTORNEY

PHOTOFLASH LAMP

This invention relates to the manufacture of photoflash lamps and more particularly to photographic flashlamp units having a plurality of lamps arranged in a unitary structure and adapted to be rotatably mounted on a camera.

A unit of the type with which this invention is concerned is known generally in the trade as a flashcube and a specific embodiment of one is shown in U.S. Pat. No 3,327,105 for example. It comprises a plurality of flashlamps, each with its own reflector, mounted on a base and enclosed within a transparent container, each of the sidewalls of which defines a window for the lamp-reflector assembly located therein.

Prior to the introduction of the flashcube, photoflash lamps were handled individually, i.e., each lamp was inserted in a suitable socket, receptacle or the like provided therefor either in the camera itself or in a flashgun attachment associated therewith. When the lamp was flashed the operator removed the flashed lamp and replaced it with a fresh one. In these circumstances there was little likelihood of confusion or doubt as to whether or not a lamp in firing position had in fact already been flashed. The lamp was relatively large in size and exposed. Even the most cursory examination would readily and quickly indicate to the operator the condition of the lamp. However, such is not the case with respect to the flashlamps in flashcubes.

The flashlamps used in flashcubes are highly miniaturized with an internal volume of less than 1 cubic centimeter. The exterior surface of the lamp envelope is covered with one or more, usually several, layers of reinforcing lacquer film of a resin such as cellulose acetate. Since these lamps are intended for use with daylight-type color film, a blue dye is usually incorporated in the protective lacquer coating. The function of such a blue coating is to modify the spectral energy output from the flashlamp combustion so as to make it similar to that of daylight.

Not only is the lamp presently used in commercial flashcubes considerably smaller than the commercial flashlamps of only a few years ago, thus making it more difficult to verify its condition, but the fact that each lamp is recessed back into its reflector also adds to the problem. The fact that the environmental light levels are usually relatively low when flash photography is used also adds to the difficulty of determining whether or not any given lamp of the four in a flashcube has already been flashed.

In addition to the foregoing, there is always the problem of verifying the unused lamps in a flashcube before remounting the flashcube on a camera after an intervening period of daylight picture taking. When the flashcube is remounted for flash pictures, it must be oriented so that an unused lamp is in firing position and other unused lamps, if any, are in the proper relation to it.

In view of the foregoing, one of the principal objects of this invention is to provide a visual indicator to show which of the lamps in a flashcube have been flashed.

We have found that flashed lamps in a flashcube can be readily identified by the use of certain easily sublimed dyes. More particularly, we have found that when a spot of paste containing such a dye is applied in heat-receiving relationship with respect to a lamp when flashed, the dye volatilizes and defines a noticeable colored area which labels that lamp as a used one. Although we prefer to apply the spot of paste on the lower surface of each lamp so that when the lamp is flashed the dye volatilizes and deposits on the adjacent window of the transparent container, it may be applied elsewhere, such as on the inside surface of each window for example. When so applied, the dye volatilizes and spreads when the lamp is flashed.

In the specific embodiment of the invention illustrated in the accompanying drawing, FIG. 1 is a front elevational view of a flashcube embodying the flashed-lamp indicator of this invention and showing it before the illustrated lamp has been flashed.

Figure 2:
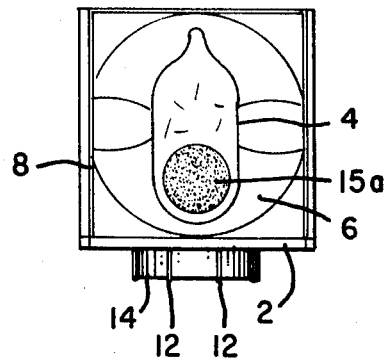

FIG. 2 is a front elevational view of a flashcube embodying the flashed lamp indicator of this invention and showing it after the illustrated lamp has been flashed.

Referring now to the drawing, particularly FIG. 1 thereof, the specific embodiment of a flashcube shown therein comprises a substantially square base or platform 2 on which four flashlamps 4 are mounted, one along each side thereof. Each lamp 4 has its own reflector 6 and the four reflectors are disposed behind the lamps on the platform. The plurality of lamp-reflector assemblies are enclosed within a transparent container 8 which is secured to the base 2 along the periphery thereof.

Each flashlamp 4 comprises a hermetically sealed light-transmitting envelope within which a combustible, such as shredded zirconium foil 10, a combustion-supporting gas such as oxygen and an ignition system are disposed. The ignition system includes a pair of lead-in wires 12 extending from the lamp and wrapped around a contact ring 14 integral with and extending downwardly from the base 2. The exterior surface of the light-transmitting envelope of each flashlamp is provided with a reinforcing lacquer film of a resin such as cellulose acetate. Since these lamps are intended primarily for use with daylight type color film, a blue dye is usually incorporated into the protective lacquer coating.

The specific embodiment of a flashed-lamp indicator illustrated in FIG. 1 of the accompanying drawing comprises a spot 15 of an easily sublimed dye applied preferably on the lower surface of each flashlamp 4 substantially as shown. When the lamp is flashed, the dye volatilizes and deposits on the inside face of the adjacent window of the transparent container 8 to form a noticeable colored area 15a (FIG. 2) which indicates and identifies the lamp as a used one. We have found that a particularly satisfactory dye paste has the following composition: 43.2 percent water, 2.3 percent polyvinyl alcohol (100 percent hydrolized), 4.5 percent dispersing agent such as lignin sulfate, 25.0 percent black nonvolatile pigment such as $Fe_3O_4$ dust, and 25.0 percent of an easily sublimed dye such as Amaplast Red AAP. Examples of other suitable dyes are Amacel Red GG, Organol Vermillion, Amaplast Green OZ, Amacel Yellow G, Amacel Blue BBN, Auramine Base and Orasol Yellow 3G.

The foregoing dyes, which all belong to a class known as solvent dyes, are characterized by high vapor pressure at the temperatures attained by the exterior surface of flashlamps of the type usually employed in flashcubes. The color or chemical structure of a dye is not of primary importance for the use proposed herein so long as it is sufficiently volatile and chemically stable. On the other hand we have found that red dyes are more noticeable against the blue background of the flashlamp.

Although each of the components of the paste has a functional purpose, and the concentrations noted above have been found to be particularly satisfactory, the exact percentage composition is not critical. Polyvinyl alcohol acts as a binding agent and as a barrier to prevent the dye from migrating into the lacquer coating and discoloring it. The concentration of polyvinyl alcohol may be varied from about 0.5 percent to about 10 percent; however, at very low values the dye bleeds into the lacquer coating whereas at high concentrations dye volatilization is inhibited. The water content of the paste may be varied from about 20 percent to about 70 percent, depending on the desired consistency or viscosity. The presence of a dispersing agent improves the application characteristics of the paste; its concentration may vary from 0 percent to about 10 percent with no significant effect on the performance of the dried spot. A black pigment, such as $Fe_3O_4$ is incorporated so that the spot absorbs infrared radiation from the radiant energy of the flash. The additional heat thus absorbed facilitates vaporization and transfer of the dye to the window of the flashcube. The concentration of the black pigment may be varied from a very small amount to about 50 percent. The dye concentration is not critical and may be varied from about 10 percent to about 60 percent.

What we claim is:

1. In a multilamp photoflash unit comprising a transparent closed container having a plurality of flashlamps disposed therein each lamp facing a different wall of said transparent container whereby a window is provided for each of said lamps, a flashed-lamp indicator comprising a spot of paste containing a dye located in heat-receiving relationship with respect to each of said flashlamps, said dye being volatilizable from the heat of lamp flashing to thereby be deposited on the inside face of said window to define a noticeable colored area on said window to thereby identify said lamp as having been flashed.

2. The combination of claim 1 in which the spot of paste containing a dye is located on the outside surface of each of said flashlamps and, when the lamp is flashed, deposits on said window.

3. The combination of claim 1 in which said dye is a solvent dye characterized by high vapor pressure at the temperatures attained by the exterior surface of the lamp on flashing.

4. The combination of claim 1 in which said paste includes a black nonvolatile pigment whereby the spot absorbs infrared radiation from the radiant energy of the flashed lamp and thus facilitates vaporization.

5. The combination of claim 1 in which the dye paste comprises water, a binding agent, a dispersing agent, a black nonvolatile pigment and an easily sublimed dye.

6. The combination of claim 5 in which the binding agent is polyvinyl alcohol, the dispersing agent is lignin sulfate and the black pigment is $Fe_3O_4$.